L. E. WATERMAN.
PLANTING MECHANISM.
APPLICATION FILED MAY 11, 1917.

1,434,575.

Patented Nov. 7, 1922.

INVENTOR
Lewis E. Waterman
By Pond & Wilson
ATTORNEYS.

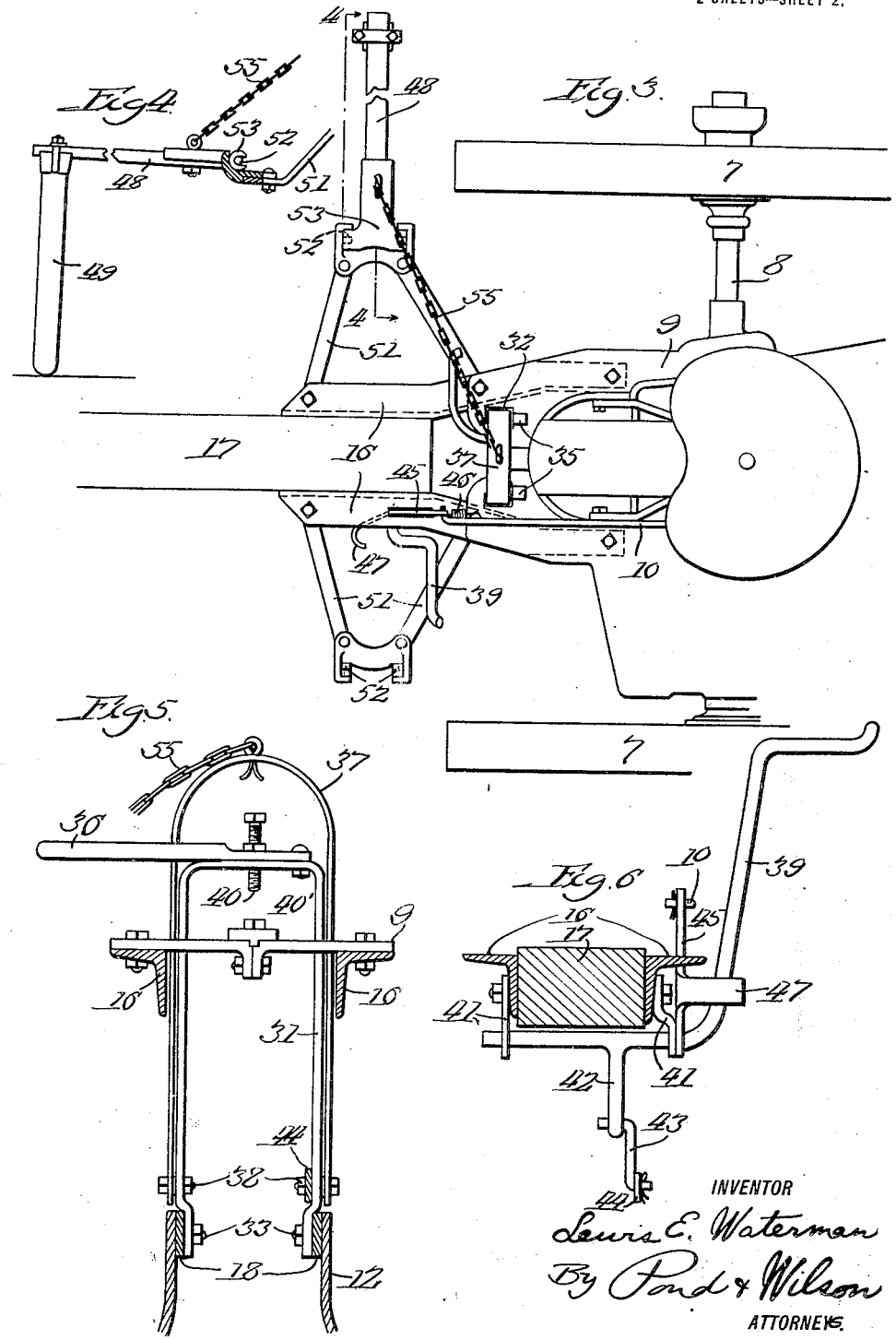

Patented Nov. 7, 1922.

1,434,575

UNITED STATES PATENT OFFICE.

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

PLANTING MECHANISM.

Original application filed January 12, 1917, Serial No. 142,013. Divided and this application filed May 11, 1917. Serial No. 167,995.

*To all whom it may concern:*

Be it known that I, LEWIS E. WATERMAN, a citizen of the United States, residing at Rockford, in the county of Winnebago and State of Illinois, have invented certain new and useful Improvements in Planting Mechanism, of which the following is a specification.

This invention relates to planting mechanism especially adapted for planting seed potatoes, and is a division of my application Serial No. 142,013, filed Jan. 12, 1917, for improvements in potato planters. The present invention pertains more particularly to the construction and control of the furrow opener or plow and the covering disks of the planting mechanism, and further relates to the devices operated by and through the agency of the mechanism for operating said furrow openers.

The invention contemplates, primarily, the provision of new and useful planting mechanism of the character described with the view to providing a more convenient and practical control of the various operating parts so that the planting of seed potatoes may be carried out in a most effectual manner.

In furtherance of this general object, I have provided improved means for simultaneously raising and lowering the furrow opening plow and covering disks so that the latter are operated by the former and these parts are automatically locked in raised position upon being elevated thereto and cause the potato-dropping mechanism to be put out of operation. I have also designed to provide an entirely foot-operated control for quickly and conveniently performing these operations so that the operator's attention need not be distracted from management of the horses.

In further connection with the improved foot control means just referred to, I have provided an improved marker which is also automatically raised by said means when the furrow opening plow is raised, and have also provided means whereby the clutch controlling the operation of the seed dropping mechanism will be thrown in and out by respectively lowering and raising said furrow opening plow. Thus it will be evident that the several devices of a potato planter which ordinarily require special attention when turning the planter at the end of each row, and necessitating the use of either one or both hands by the operator to put them out of operation, are controlled entirely by the simple operation of one foot lever, thereby allowing the operator to more expeditiously and correctly make the turn.

Referring to the drawings:

Fig. 3 is a plan view of my improved planting mechanism illustrating fully only those portions to which this invention particularly relates;

Figure 1:
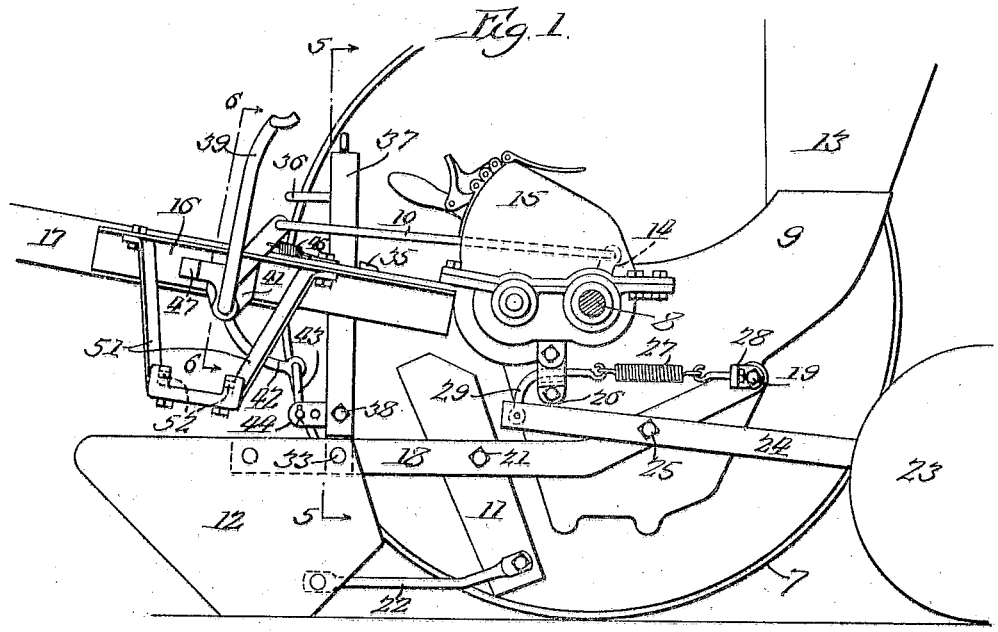
Figure 1 is a side elevation of a potato planter embodying my improvements, the near wheel being removed and the furrow opener and covering disks being shown in a lowered position.

Fig. 4 is a vertical sectional view taken substantially on the line 4—4 of Fig. 3; and Figs. 5 and 6 are vertical sectional views taken substantially on the lines 5—5 and 6—6 of Fig. 1.

In this invention, which relates mainly to the construction and operation of the furrow opener and covering disks and to devices such as a marker and a clutch for putting the seed dropping mechanism into and out of operation, I have deemed it necessary to illustrate in the drawings only such parts of the potato planter, which is fully shown in my above mentioned copending application, as will suffice for a clear understanding of my present improvements. Hence it will be noted that the potato-dropping mechanism per se and the driving means are not shown in the drawings accompanying this application. A brief description will be given, however, of the parts illustrated and of their general function in a potato planter.

The carrying wheels 7 support a main drive shaft 8 upon which is mounted a frame designated generally by character 9, which also constitutes a potato magazine. Within this magazine and mounted upon and revolving about the shaft 8, is a potato dropping mechanism (not shown) which is adapted to successively pick single seed potatoes from the magazine and deposit or drop them into a down spout 11 which guides the seeds into a furrow formed by a furrow opener or plow 12. The seed potatoes are supplied to the magazine from a hopper 13 and the seed dropping mechanism is put into and out of operation by means of a clutch actuated by an oscillatable part 14, the speed of operation of the seed dropping mechanism being governed by a change speed mechanism designated generally by character 15, all of which are fully illustrated and described in my co-pending application mentioned above. Hounds 16 in the form of angle iron bars are bolted to the forward side portions of the main frame or magazine 9 and have interposed therebetween and bolted thereto a tongue 17. Suitable draft or hitch devices may be applied to the tongue as is well understood in the art. In the type of potato planter to which my present invention relates single seed potatoes are successively dropped at uniform intervals into a down spout which guides them into furrow formed by a furrow opener or plow as mentioned above. The seed thus deposited is then covered by covering disks drawn at the rear of the planting mechanism and arranged to close the furrow and properly embed the seed in the ground. It is desired to simultaneously lower and raise the down spout, furrow opener and covering disks when commencing and discontinuing the planting operation at the beginning and end of a row and further to simultaneously put the seed dropping mechanism into and out of operation and also to move into and out of operative position a marker for marking the ground so that the operator may properly guide the team when planting the next row. My invention contemplates the control of all of these devices by means of a single foot lever which, when actuated, will raise from operating position the down spout, furrow opening plow and covering disks and also the marker and will discontinue the operation of the seed dropping mechanism. When the lever has been thus actuated, the parts will be automatically locked by a simple device in their respective inoperative positions and the operator may, at will, release the parts from such position by simply actuating a foot stirrup, thereby putting all the devices into operation again. It will thus be seen that by means of these improvements which will be presently fully described the driver of my potato planter may expediently operate all of the devices necessary during the operation of planting and that such operation requires only the use of the operator's feet. Thus the operator's attention and the free use of his hands may be given to guiding the horses so that accurate planting may be obtained.

Coming now to my present improvements, the furrow opening plow 12 located forwardly of the down spout 11 mentioned above, is rigidly secured to the forward end of a frame formed by a pair of rearwardly diverging side bars 18 pivotally secured at their rear ends to the main frame by means of bolts 19. The down spout 11 interposed between these side bars is connected thereto by bolts 21 and is further held in position by a brace bar 22 connected at its forward end to the plow 12. The furrow-opening plow as thus mounted is capable of being swung vertically with respect to the main frame. A pair of disk covering shovels 23 may be suitably mounted on a frame 24 so as to be capable of proper angular adjustment with respect thereto, the frame being in the form of forwardly extending side bars pivotally mounted intermediate their ends at 25 on the side bars 18 and extending forwardly beneath laterally projecting lugs 26 on the main frame. The covering shovel frame is under the constant influence of contractile springs 27 arranged to urge the disks into the ground. As shown, these springs are adjustably connected at one end to a fixed plate 28, held by the bolts 19 and at their opposite ends by links 29 passing over the lugs 26 and pivotally connected to the forward ends of the bars 24. When the plow and covering shovels are in the ground (in which position they are not shown in the drawings) the forward ends of the bars 24 will be slightly spaced below the lugs 26 so that the covering shovels are free to move vertically, being held in lowered position under the influence of the springs 27. The covering shovels are, therefore, yieldingly urged into the ground to properly turn into the furrow the loose soil flanking the same, and when passing over irregular ground or obstructions of any kind the covering disks are free to rise and pass over such obstructions. When the plow 12 is raised the forward ends of the bars 24 will abut against the undersides of the lugs 26, thereby causing as the plow is continued to be raised, the shovels to be swung upwardly on the pivots 25 so as to be raised completely from the ground to the elevated position shown in Fig. 2.

Figure 2:
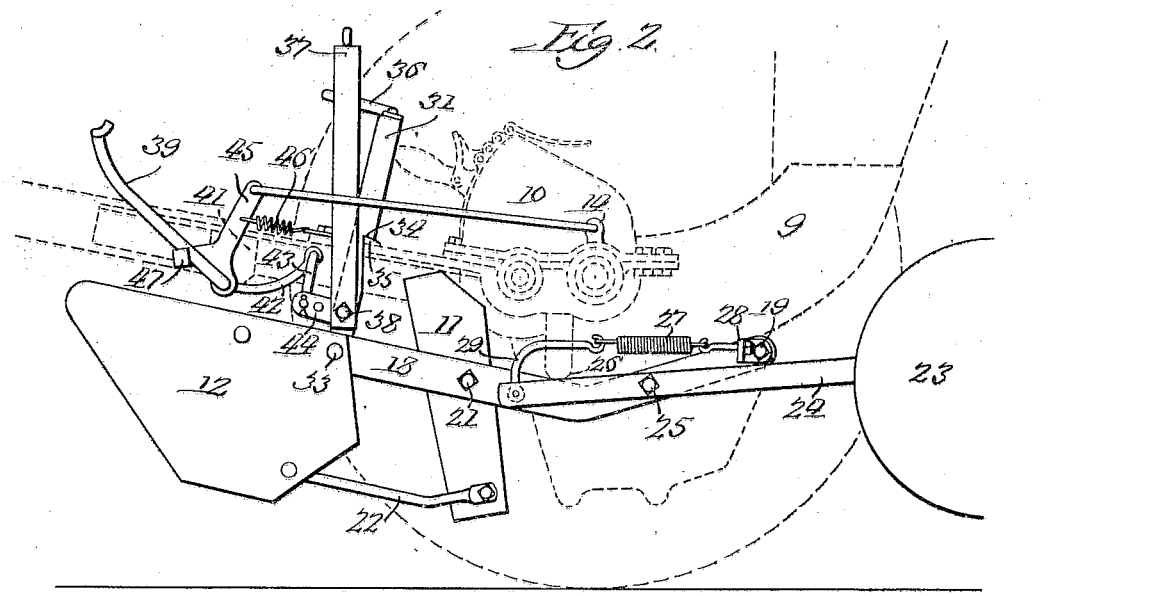
Fig. 2 is a side elevation somewhat similar to Fig. 1, showing the position the parts assume when the furrow opener is raised.

Foot-operated means is employed for accomplishing this raising movement and provided for automatically locking the plow and covering shovels in raised position upon being elevated thereto and for simultaneously disengaging the clutch in the driving connection to the picker arms or seed dropping mechanism mentioned above. An upright bail 31, the arms of which pass through openings 32 in the forward extension of the main frame, is pivotally connected at its lower ends by bolts 33 to the plow 12. The arms of the bail on their rear sides are each formed with a notch 34 (Fig. 2) so that when the plow is raised these notches may be engaged by the fixed abutments 35 on the main frame to lock the plow in raised position. A foot stirrup 36 secured to the upper end of the bail 31 affords a means by which the bail may be easily moved forwardly and disengaged from the abutments 35. A second bail 37 disposed on the outer side of the bail 31 is pivotally mounted thereon at 38, and passes through the opening 32, serving a purpose apparent hereinafter. A foot lever 39 pivotally mounted in brackets 41 bolted to the hounds 16 is provided with a rearwardly and downwardly extending arm 42 pivotally connected by means of a short link 43 to the forward end of a short projecting arm 44 fixedly secured to the bail 31. The arrangement is such as to cause a rearward thrust on the bail 31 when the lever 39 is swung forwardly to raise the plow, and this bail being thrust rearwardly into engagement with the abutments 35 will be locked in connection therewith when the notches 34 reach said abutments, as will be obvious. A lever 45 pivotally mounted on the horizontal pivot portion of the lever 39 is pivotally connected at its upper end to the forward end of the clutch shifting rod and a contractile spring 46 connecting said lever 45 to a part of the frame tends to urge this lever in the direction to engage the clutch. The lever 45 is provided with a forwardly projecting arm 47 located in the path of the lever 39, as shown in Figs. 2 and 3, so that when the lever 39 is swung forwardly to raise the plow and covering disks the lever 45 will be actuated to disengage the clutch which drives the seed dropping mechanism. When it is desired to lower the plow and covering disks and engage the clutch mentioned the operator will press the foot stirrup 36 forwardly, thereby disengaging the bail 31 from locked position and allowing the parts to move under the weight of the plow and covering disks to working position. This working position is limited by contact of an adjustable part such as a bolt 40 carried by the bail 31 against a fixed part such as 40' secured to the forward portion of the main frame. As shown in Fig. 1, the plow 12 is not fully lowered to its working position; hence, the adjustable stop 40 (Fig. 5) which limits the working depth of the plow has not reached the fixed part 40', the plow being free to lower until the stop 40 abuts against the part 40'. By adjusting the bolt 40 it will be manifest that the working depth of the tools may be varied.

A marking attachment is also provided for marking the ground for guidance in planting the next adjacent row. This attachment consists of a marking bar 48 equipped at its outer end with a marker 49 and being suitably mounted so that it may be raised and lowered from operative position and moved to either side of the planter for marking on both sides thereof. A suitable mounting for the marker consists of saddles or supports 51 mounted upon and projecting laterally from the hounds 16 and equipped at their outer ends with opposed pintles 52 which the slotted brackets 53 attached to the marker bar are adapted to pivotally engage. The slotted head of the bracket 53 is entered upon the pintles by placing the marker bar in an upright position so that the pintles may enter the slots from beneath, whereupon the marker is swung outwardly to the horizontal position shown in Fig. 4, the ears 54 of the supports 51 engaging behind the lateral extensions of the bracket 53 so as to hold the marker in position. The marker is connected by means of a chain 55 or any flexible connection to the top of the bail 37. When the furrow-opening plow and covering disks are raised in the manner described above, it will be evident that the bail 37 in being raised will raise the marker from the ground through the medium of the chain connection 55, it being desirable to secure the marker connection to a bail or part separate from the bail 31 because a forward pull on the latter would have a tendency to prevent it from being properly engaged with the abutments 35.

In the operation of a potato planter of this character it is a well known practice to plant in rows and to turn the planter about when the end of the field is reached to commence a new row. When the end of the field is reached the operator may put all of the operating parts out of operation by pressing forwardly on the lever 39 with one foot, thereby moving the parts to the position shown in Fig. 2. This raises the furrow opening plow and covering disks and automatically locks them in elevated position, throws out the clutch so as to discontinue the drive of the potato dropping mechanism and raises the marker from the ground. As a result of this simple control the driver has both hands free to guide the team in making the turn and consequently, his attention need be in no way distracted from the guidance of the horses. When the planter has been turned and the planting is resumed the driver may put all of the working parts into operation again by simply pressing forwardly on the foot stirrup 36. This disengages the bail 31 from its locked position, allowing the plow and disks to assume their lowered position, the clutch to be engaged and the marker to fall back into marking position.

With respect to the marker, it will be noted that when the planter has been turned about it will be necessary to position the marker on the opposite side of the planter. This may be easily done by swinging the bar 48 to a vertical position and raising the marker so as to disengage it from the pintles 52. The marker may then be attached to its supporting means on the opposite side of the planter in the manner described above, and when the parts are put into operation the marker will be lowered to operative position as just mentioned. It will be noted that when the parts have been moved to inoperative position the marker bar while being lifted from the ground will not be brought within reach of the operator. The operator may, however, swing the marker into reach by pressing downwardly on the chain 55 intermediate its length with his foot in a quick movement which will swing the marker bar inwardly against the hounds. The operator may then reach forwardly and very easily remove the marker and place it on its opposite saddle and swing it outwardly to a position limited by the chain.

It is believed that the foregoing conveys a clear understanding of the objects of the invention prefaced above, and it should be understood that various changes might be made in the arrangement and construction of parts without departing from the spirit and scope of the invention as expressed in the appended claims:

I claim:

1. In a planter, the combination of a wheel-supported frame, a seed-dropping mechanism thereon, a plow located forwardly of the dropping mechanism and movable vertically with respect to the frame, an upright part connected with the plow and co-operating with he frame, a lever, means operable between the lever and plow and said part for raising the plow and imparting a side thrust to said part, and means against which said part is urged by said side thrust when the plow is elevated and with which said part is engageable to automatically lock the plow in elevated position.

2. In a planter, the combination of a frame, a seed-dropping device thereon, a plow located forwardly of the seed-dropping device and pivotally mounted on the rear portion of the frame so that the plow may swing vertically, covering disks located at the rear portion of the frame, a frame upon which the covering disks are mounted and which is pivotally mounted on the plow-carrying frame and engageable with a part fixed with respect to the main frame to cause the covering-disk frame to be rocked on its pivot when the plow is raised to thereby raise the covering disks, means for yieldingly urging the covering disks in a downwardly direction, and means for raising the plow-carrying frame.

3. In a planter, the combination of a main frame, a plow-carrying frame pivotally mounted on the rear portion of the main frame, an upstanding bail mounted on the forward portion of the plow-carrying frame and passing above the main fame, a second bail connected with the first bail and engageable with a part fixed to the main frame when the plow is raised to thereby hold the plow in raised position, and a marker mounted on the main frame and connected to the first bail so as to be raised therewith.

4. In a planter, the combination with a main frame equipped with a seed-dropping device, of a frame pivotally mounted on the main frame and equipped with a furrow-opening plow arranged so as to be vertically movable and to form a furrow into which the seed may be dropped, a frame equipped with a covering disk or the like arranged for covering the seed after it has been deposited in the furrow, the covering disk frame being pivotally mounted on the plow frame, means yieldingly urging the covering disk frame in a direction to move its disk downwardly into operative position, means for raising and lowering the plow frame whereby to raise and lower the pivotal mounting of the covering disk frame, and means for causing the covering disk frame to raise bodily with the plow frame after the same has been raised a predetermined extent and for allowing the covering disk frame to move independently of the plow frame under the influence of said yielding pressure means after the plow frame has been lowered into working position.

LEWIS E. WATERMAN.